US012779967B1

(12) United States Patent
Almond et al.

(10) Patent No.: US 12,779,967 B1
(45) Date of Patent: Nov. 3, 2026

(54) PROTECTIVE SCREEN FOR VEHICLES

(71) Applicants: Virginia Almond, Gretna, VA (US); Randall Blankenship, Gretna, VA (US)

(72) Inventors: Virginia Almond, Gretna, VA (US); Randall Blankenship, Gretna, VA (US)

( * ) Notice: Subject to any disclaimer, the term of this patent is extended or adjusted under 35 U.S.C. 154(b) by 337 days.

(21) Appl. No.: 18/438,048

(22) Filed: Feb. 9, 2024

(51) Int. Cl.
*B60J 11/08* (2006.01)
*B60J 1/02* (2006.01)
*B60J 1/04* (2006.01)

(52) U.S. Cl.
CPC ................. *B60J 11/08* (2013.01); *B60J 1/02* (2013.01); *B60J 1/04* (2013.01)

(58) Field of Classification Search
CPC ....... B60J 1/02; B60J 1/025; B60J 1/04; B60J 11/08; B60J 1/2063; B60J 1/2066; B60J 1/2077; B60J 1/2011; B60J 3/02; B60J 3/0286; B60J 1/2041; B62J 17/02
USPC .......... 296/77.1, 95.1, 84.1, 90, 96.21, 1.07, 296/107.11, 100.15, 100.16
See application file for complete search history.

(56) References Cited

U.S. PATENT DOCUMENTS 864,952 A * 9/1907 Charles .................... B60J 11/00 296/83
2,065,242 A * 12/1936 Omerly, Jr. .............. B60J 11/08 160/354
2,907,384 A * 10/1959 Spratt ...................... B60J 11/08 160/370.21
4,848,825 A * 7/1989 Niernberger ............. B60J 11/08 160/370.21
4,948,192 A * 8/1990 Sohne ...................... B60J 11/08 160/370.21
5,292,167 A * 3/1994 Hellman .................. B60J 11/08 160/370.21
5,299,849 A * 4/1994 Cook ....................... B60J 7/104 296/159
6,007,134 A * 12/1999 Weston .................... B60J 11/00 280/DIG. 5
6,220,648 B1 * 4/2001 Daniel ..................... B60J 11/00 296/136.02
6,926,334 B1 * 8/2005 Diehm ....................... B60J 1/00 296/138
7,147,263 B2 12/2006 Schneidau et al.
8,888,163 B1 * 11/2014 Johnson ..................... B60J 1/20 296/84.1
9,016,755 B2 * 4/2015 Ein .......................... B60J 11/08 296/95.1
9,352,636 B1 5/2016 Johnson
(Continued)

*Primary Examiner* — Amy R Weisberg
*Assistant Examiner* — Denise L. Esquivel
(74) *Attorney, Agent, or Firm* — Sanchelima & Associates, P.A.; Christian Sanchelima; Jesus Sanchelima

(57) ABSTRACT

A protective screen for vehicles including a mesh assembly, an attaching assembly and a vehicle assembly. The vehicle assembly includes a vehicle having an open front and a frame. The mesh assembly includes a mesh. The attaching assembly includes cords to attach the mesh to the frame of the vehicle assembly. The mesh covers the open front of the vehicle to prevent insects, dust, and debris from impacting the users of the vehicle while still allowing air to flow through. The attaching assembly further includes bungee cords to tighten and secure the mesh to the frame.

1 Claim, 4 Drawing Sheets

(56) References Cited

U.S. PATENT DOCUMENTS

| | | | | |
|---|---|---|---|---|
| 2008/0164713 | A1* | 7/2008 | Saurman | G09F 7/18<br>296/77.1 |
| 2010/0066118 | A1* | 3/2010 | Miller | B60J 1/2011<br>296/107.11 |
| 2011/0303371 | A1* | 12/2011 | Harrison | B60J 1/2011<br>160/370.21 |

* cited by examiner

PROTECTIVE SCREEN FOR VEHICLES

II. BACKGROUND OF THE INVENTION

1. Field of the Invention

The present invention relates to screen vehicles and, more particularly, to a protective screen for vehicles that includes a meshed screen assembly attached to an open-front vehicle.

2. Description of the Related Art

Several designs for screen vehicles have been designed in the past. None of them, however, include a protective screen vehicle comprising a meshed screen assembly that allows air to flow through while preventing dust, debris, and insects from entering the vehicle.

Applicant believes that a related reference corresponds to U.S. Pat. No. 7,147,263 issued for a screen with a flexible frame configured to be attached to a golf cart. Applicant believes that another related reference corresponds to U.S. Pat. No. 9,352,636 issued for a wraparound meshed screen for a utility vehicle. None of these references, however, teach of a protective screen vehicle that includes a mesh screen assembly attached to an open front vehicle with strap members.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a protective screen vehicle that is removably attached to the front open of a vehicle using straps.

It is another object of this invention to provide a protective screen vehicle that creates a barrier that prevents dust, debris, and insects from impacting the vehicle's occupants.

It is still another object of the present invention to provide a protective screen vehicle that includes bungee straps to tighten the protective screen to the vehicle frame.

It is yet another object of the present invention to provide a protective screen vehicle that includes a mesh screen assembly that allows the air to flow through.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
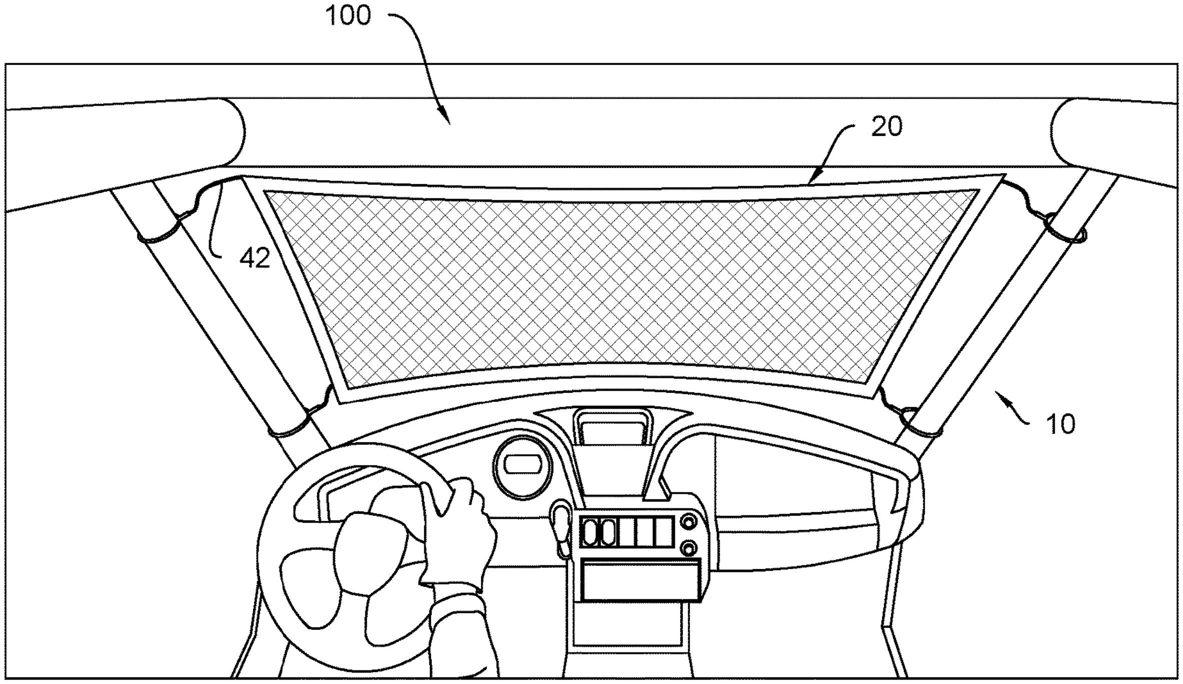

With the above and other related objects in view, the invention consists in the details of construction and combination of parts as will be more fully understood from the following description, when read in conjunction with the accompanying drawings in which:

FIG. 1 represents an operational view of the present invention 10 showing the screen assembly 20 attached to a frame of the vehicle 100 assembly. The screen assembly 20 protects the users from being hit by insects and debris when driving.

Figure 2:
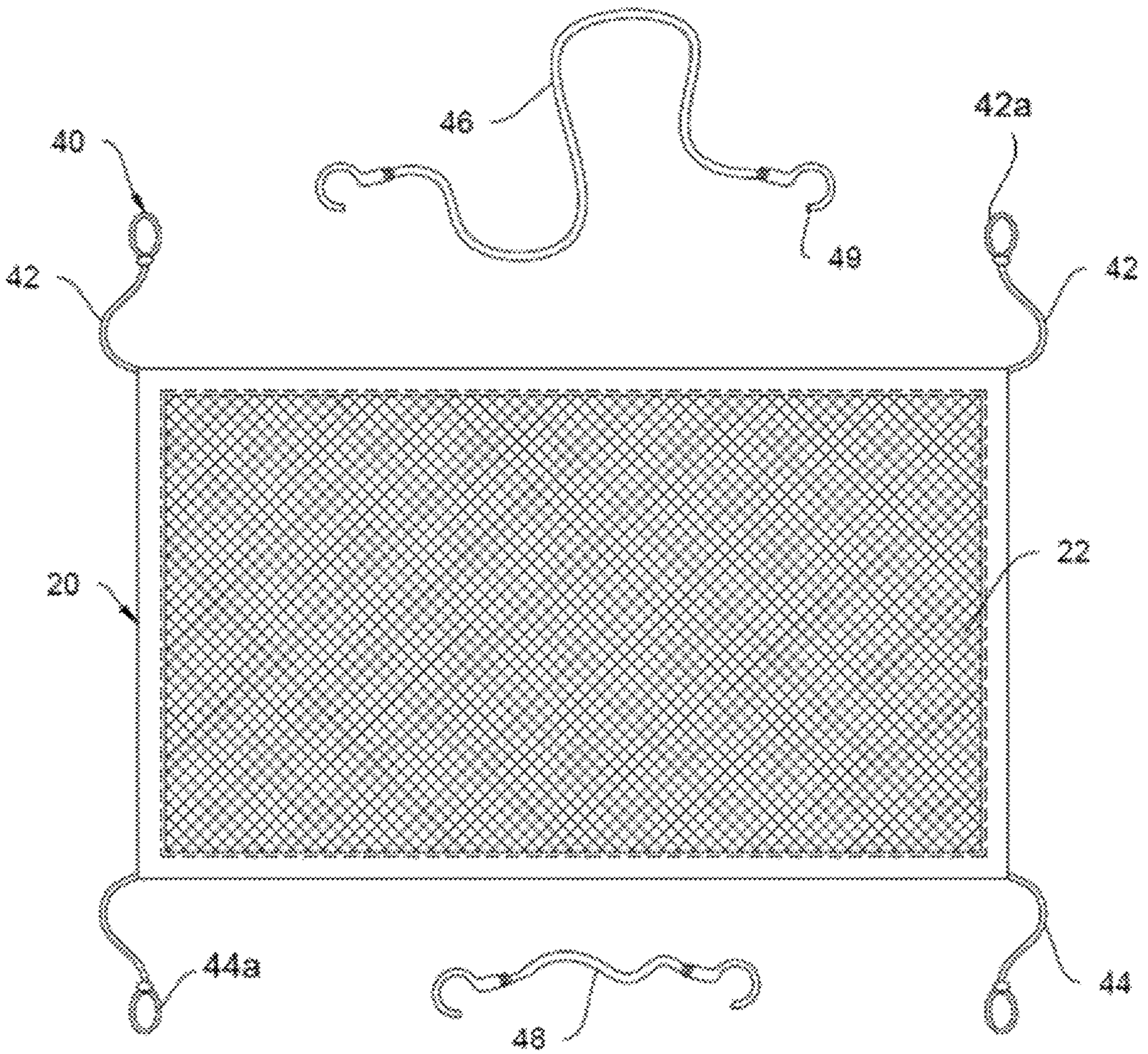

FIG. 2 shows a front view of the screen assembly 20 and the attaching assembly 40, including top cord 42, bottom cord 44, first bungee cord 46, and second bungee cord 48.

Figure 3:
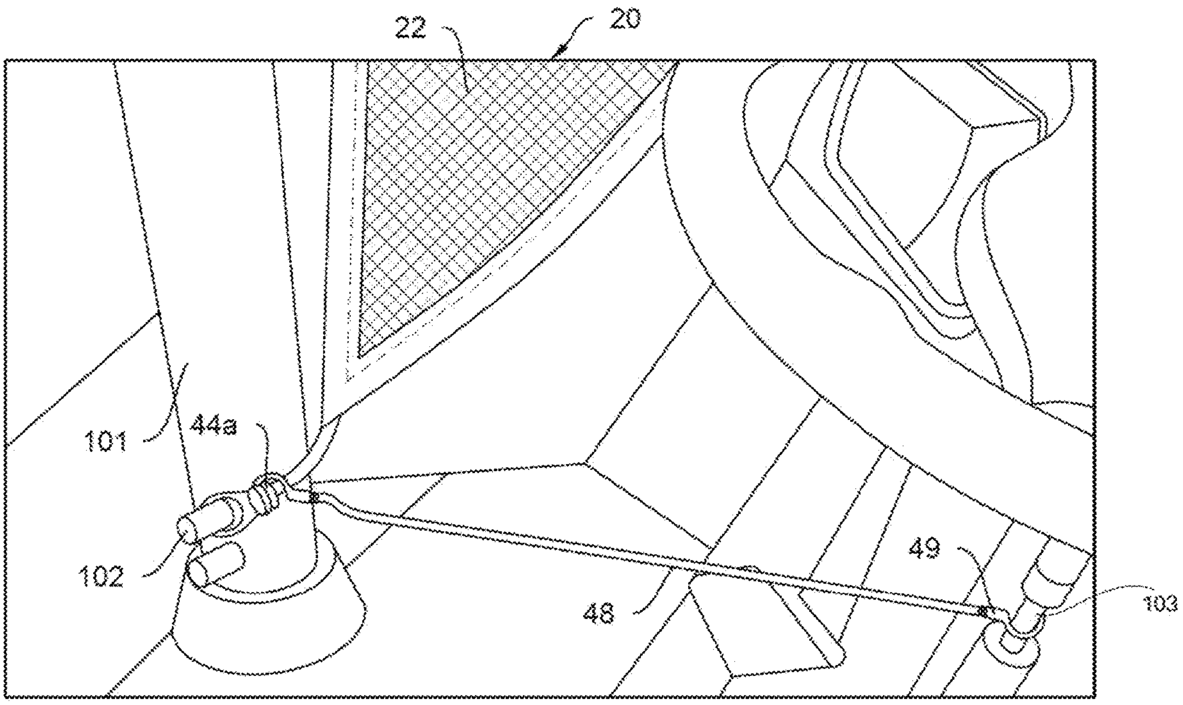

FIG. 3 illustrates an enlarged view of the attachment of a portion of screen assembly 20 to vehicle assembly 100 using the bottom cord 44 and the bungee cord 48.

Figure 4:
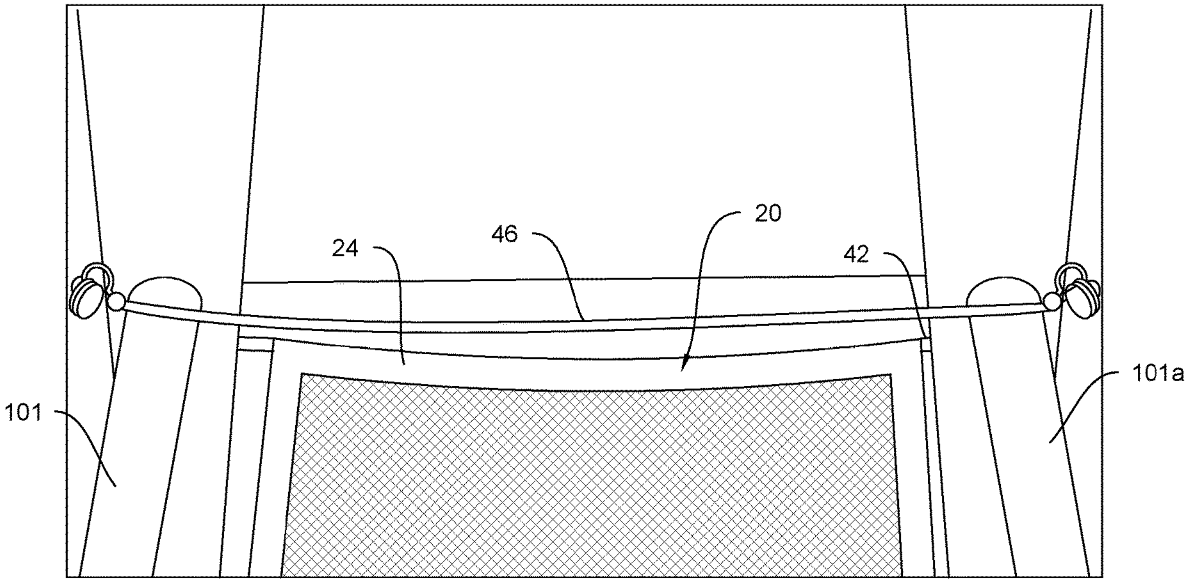

FIG. 4 is a representation of an enlarged view of the present invention 10 showing the screen assembly mounted to a top portion of the frame of the vehicle assembly 100 using the first bungee cord 48.

V. DETAILED DESCRIPTION OF THE EMBODIMENTS OF THE INVENTION

Referring now to the drawings, where the present invention is generally referred to with numeral 10, it can be observed that it basically includes a screen assembly 20, an attaching assembly 40, and a vehicle assembly 100. It should be understood there are modifications and variations of the invention that are too numerous to be listed but that all fit within the scope of the invention. Also, singular words should be read as plural, and vice versa and masculine as feminine and vice versa, where appropriate, and alternative embodiments do not necessarily imply that the two are mutually exclusive.

The vehicle assembly 100 may include a vehicle having a frame. Preferably, the vehicle assembly 100 may be a Utility Task Vehicle, an All-Terrain Vehicle, or any other vehicle with an open front. The vehicle assembly 100 may have a vehicle frame with a left bar 101 and a right bar 101*a*. It is noted that vehicles with an opened front are well-known in the art. Therefore, the vehicle assembly 100 is not described in detail herein, and the explanatory components aforementioned are not intended to be used as limitative but rather as basis and/or principle for the claims, and/or as representative basis for teaching one skilled in the art to employ this invention in virtually appropriately detailed system, structure, or matter.

The screen assembly 20 may include a mesh 22. The mesh 22 may be a woven mesh with interconnecting strands. The mesh 22 may have holes distributed across a surface thereof. The holes of the mesh 22 may have a predetermined size that prevents insects, debris, or other air particles from going through while still allowing the circulation or air. The mesh 22 may be made of polymers, metals, or other suitable fibers. Preferably, the mesh 22 may be made of a weatherproof material or have a coating that protects the mesh 22 against harsh outdoor applications. The fibers of the mesh 22 may be randomly or evenly distributed. The mesh features a fine and transparent composition that allows a driver to see through it without obstruction.

In one embodiment, the mesh 22 may be flexible for easy installation and transportation. Nonetheless, it also may be suitable to have a rigid mesh. In one of the preferred embodiments, the mesh 22 may have a rectangular shape. It also may be suitable to have the mesh 22 with other shapes to adapt the geometry of the front open of the frame of the vehicle assembly 100.

The screen assembly 20 may further include a fold portion 24. The fold portion 24 may be attached to a perimeter of the mesh 20. The fold portion 24 may serve as a reinforcement support for the mesh 22. The fold portion 24 may be made of a fabric, a polymer or other suitable flexible material. It also may be suitable to have a rigid reinforcement support for the perimeter of the mesh 22. The fold portion 24 may be folded and attached to the perimeter of the mesh 24 using stitching. The fold portion 24 may be attached to the mesh 22 using other suitable attaching methods known in the art. The fold 24 may have an interior hollow portion defining an interior channel with openings at distal ends that communicates from one corner of the mesh to a second corner of the mesh.

The attaching assembly 40 may include a first cord 42 and a second cord 44. The first cord 42 and second cord 44 may be a cotton rope, a poly anchor rope, a polyethylene mono rope, an elastic cord or any other suitable rope known in the art. The first cord 42 may be embedded in a channel of the top portion of the fold portion 24. The first cord 42 may have a length greater than the length of the top side of the fold portion 24. A first portion of the first cord 42 may extend beyond a top left corner of the fold portion 24. A second portion of the first cord 42 may extend beyond a top right corner of the fold portion 24. The first cord 42 may allow to removably attach the screen assembly 20 to top positions of the left bar 101 and right bar 101*a* of the frame of the vehicle assembly 100.

The second cord 44 may be embedded in a channel of the bottom portion of the fold portion 24. The first cord 42 may have a length greater than the length of a bottom side of the fold portion 24. A first portion of the second cord 44 may extend beyond a bottom left corner of the fold portion 24. A second portion of the second cord 44 may extend beyond a bottom right corner of the fold portion 24. The second cord 44 may allow to removably attach the screen assembly 20 to bottom positions of the left bar 101 and right bar 101*a* of the frame of the vehicle assembly 100.

The attaching assembly 40 may further include a first bungee cord 46 and second bungee cords 48. The first bungee cord 46 may have a length grater than a length of the second bungee cords 48. The first bungee cord 46 and the second bungee cords 48 may be elastic cords with hooks 49 located at each distal end of thereof. The first bungee cord 46 may allow to tighten the first cord 42 to the vehicle assembly 100. As observed in FIG. 4, a top portion of the screen assembly 20 may be secured to top portions of the left bar 101 and right bar 101*a*. Distal ends of the cord 42 may be located above a crossbar of the frame located between left bar 101 and right bar 101*a*. The first cord 42 may have distal ends with knots 42*a* therein. Hooks 49 of the first bungee cord 46 may be engaged to the knots 42*a* to make the attachment tighter.

The second cord 44 may have distal ends having a loop knot 44*a* to be engaged and secured to mirror bolts 102 of the vehicle assembly 100. The hooks 49 of a first distal end of each of the second bungee cords 48 may be engaged to the loop knot 44*a*. The hooks of a second distal end of the second bungee cords 48 may be secured to an attaching member 103 of the vehicle assembly 100 for additional tightening. It should be understood that the locations of the attaching portions where the second cords 44 and the second bungee cords 48 are attached to are exemplary and not limitative. The second bungee cords 48 may be engaged and secured to other portions of the frame of the vehicle assembly 100. Similarly, the first cord 42 may be secured to other portions of the frame of the vehicle assembly 100. The attaching assembly 40 may secure the screen assembly to the vehicle assembly 100 to cover as much as possible the open front of the vehicle assembly 100 to allow that the mesh 22 filter the debris, dust and insects while still allowing the air to flow through. This design facilitates a balance between protection and visibility, allowing the driver to maintain a clear view of the road ahead while benefiting from the mesh's protective features.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protective screen for vehicles, consisting of:

a vehicle assembly including a left bar, a right bar and an open front;

a screen assembly including a mesh and a fold portion, said mesh has a rectangular shape, said fold portion has stitching creating a folded portion with a hollow interior, said mesh covering the open front of the vehicle assembly; and an attaching assembly including a first cord, a second cord, a large bungee cord, a plurality of hooks, and two small bungee cords, said first cord is received by a top channel of the fold portion, said second cord is received by a bottom channel of the fold portion, said first cord has knots at each distal end, each distal end of said large bungee cord has one of the hooks of the plurality of hooks, the second cord has loop knots at each distal end, each distal end of each of the two small bungee cords has one hook of the plurality of hooks, the knots of the first cord are engaged with the hook of each distal end of the large cord to removably attach the mesh to the left bar and to the right bar, wherein the loop knot of each distal end of said second cord is removably attached to bolts located on the vehicle assembly, said two bungee cords tighten and secure the mesh to the vehicle assembly.

* * * * *